United States Patent [19]

Kelman et al.

[11] Patent Number: 5,688,467
[45] Date of Patent: Nov. 18, 1997

[54] APPARATUS AND METHOD FOR FABRICATING A PREFORM HAVING A NARROW CHANNEL FLANGE

[75] Inventors: John Kelman, Dover; David R. Pinson, Rochester, both of N.H.

[73] Assignee: Davidson Textron Inc., Dover, N.H.

[21] Appl. No.: 566,042

[22] Filed: Dec. 1, 1995

[51] Int. Cl.⁶ .................. B27N 5/00; B60R 13/01
[52] U.S. Cl. .............. 264/517; 264/510; 264/112; 425/80.1; 296/39.2; 296/901
[58] Field of Search ................. 264/517, 510, 264/112, 121; 296/39.2, 39.1, 901; 425/80.1

[56] References Cited

U.S. PATENT DOCUMENTS

| | | | |
|---|---|---|---|
| 4,333,678 | 6/1982 | Munoz et al. | 296/39.2 |
| 4,336,963 | 6/1982 | Nix et al. | 296/39.2 |
| 4,796,942 | 1/1989 | Robinson et al. | 296/39.2 |
| 5,046,775 | 9/1991 | Marcum, Jr. et al. | 296/39.2 |
| 5,083,830 | 1/1992 | Mucher et al. | 296/39.2 |
| 5,147,653 | 9/1992 | Nelson | 425/470 |
| 5,217,672 | 6/1993 | Kelman et al. | 264/517 |
| 5,328,494 | 7/1994 | Kelman et al. | 65/60.1 |
| 5,336,455 | 8/1994 | Kelman | 264/113 |
| 5,376,327 | 12/1994 | Di Natale et al. | 264/517 |
| 5,413,750 | 5/1995 | Kelman et al. | 264/517 |
| 5,513,934 | 5/1996 | German | 296/39.2 |
| 5,520,758 | 5/1996 | Kelman et al. | 264/517 |

*Primary Examiner*—Mary Lynn Theisen
*Attorney, Agent, or Firm*—Reising, Ethington, Barnard & Perry

[57] ABSTRACT

An apparatus (10) for use in manufacturing a fibrous preform with a narrow channel flange includes a foraminous preform screen (12), a fiber nozzle (28) that blows a stream of chopped fibers onto the screen (12) and binder nozzles (32) that spray binder into the fiber stream. Air blown from air nozzles (30) helps guide the fibers and a ducted fan (26) helps draw and hold them onto the screen (12). The screen (12) is formed with a narrow channel flange (16) having a shape identical to the narrow channel flange of the fibrous preform to be manufactured. The screen's flange (16) has a channel floor (36) extending laterally outward from the screen's main body (14) and a channel outer wall (38) projecting perpendicularly away from the channel floor (36) toward the fiber nozzle (28). A hinge (40) connects the channel floor (36) to the channel outer wall (38). To allow the nozzles to deposit a more uniform layer (42) of fibers, the outer wall (38) is rotated outward to lie parallel with the channel floor (36). Following fiber deposition, the outer wall (38) is rotated back inward. After curing, the wall (38) is rotated outward again to facilitate preform (12) removal.

10 Claims, 3 Drawing Sheets

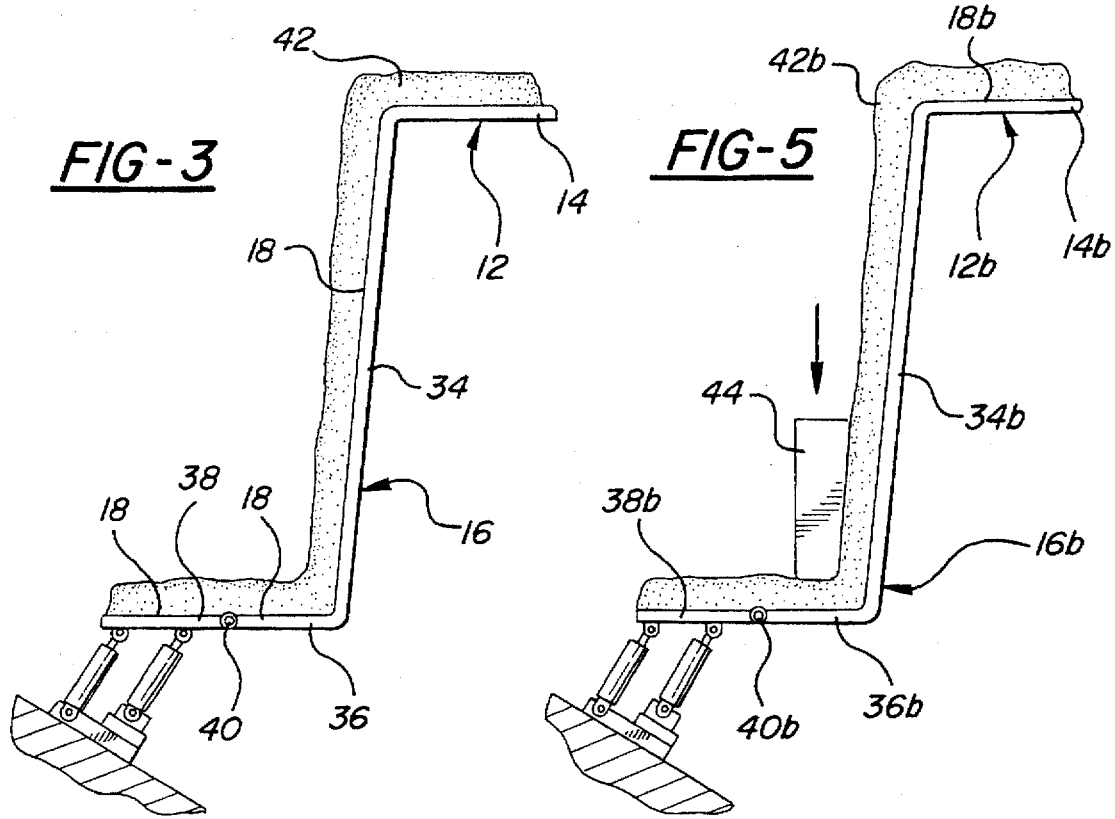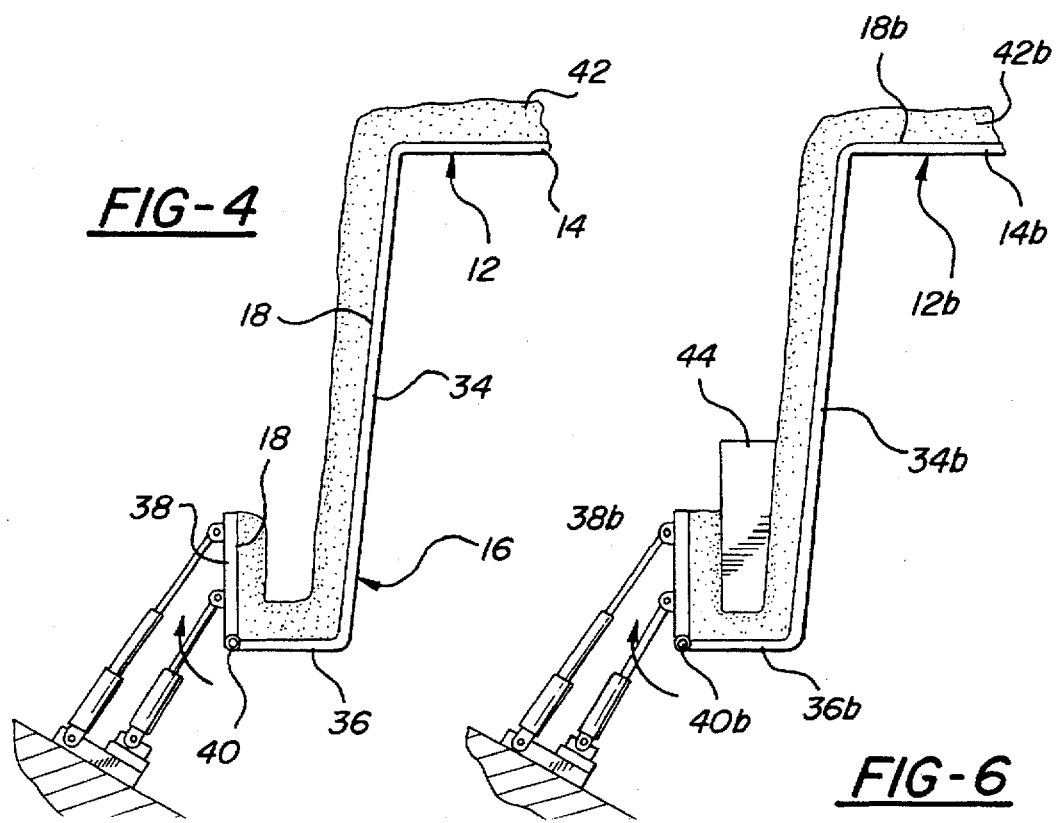

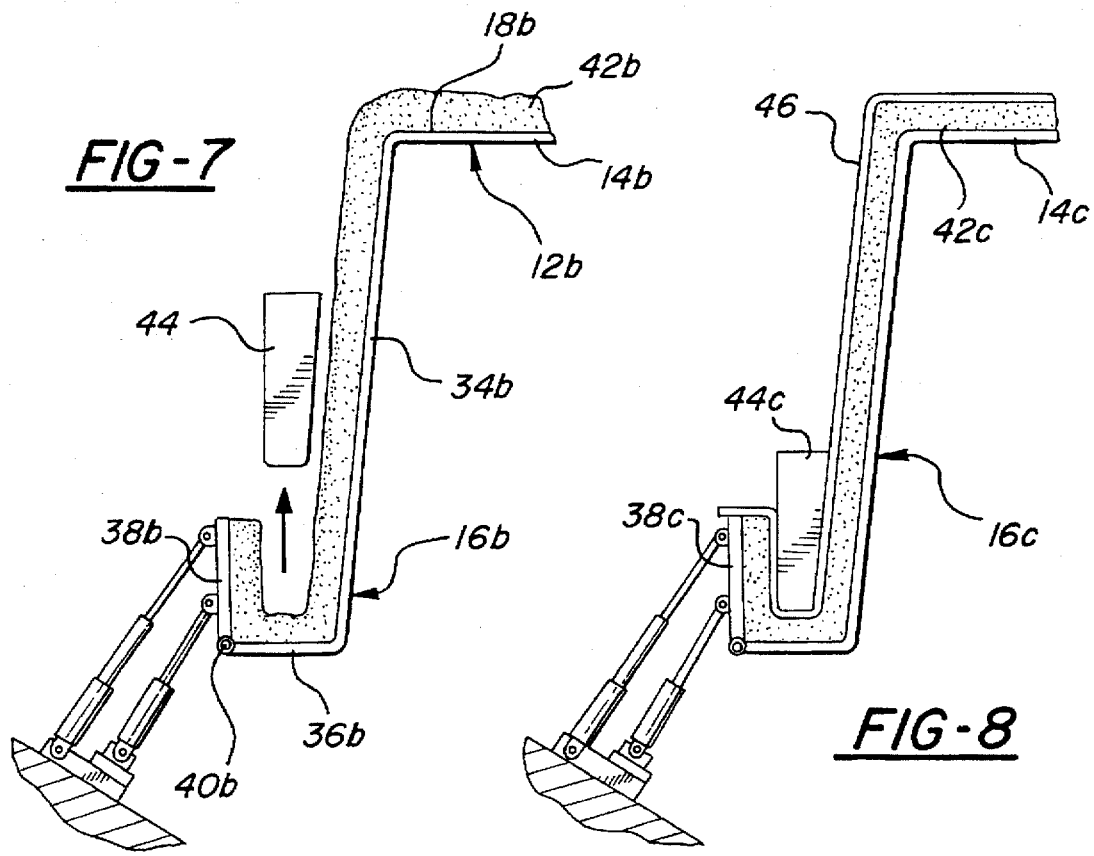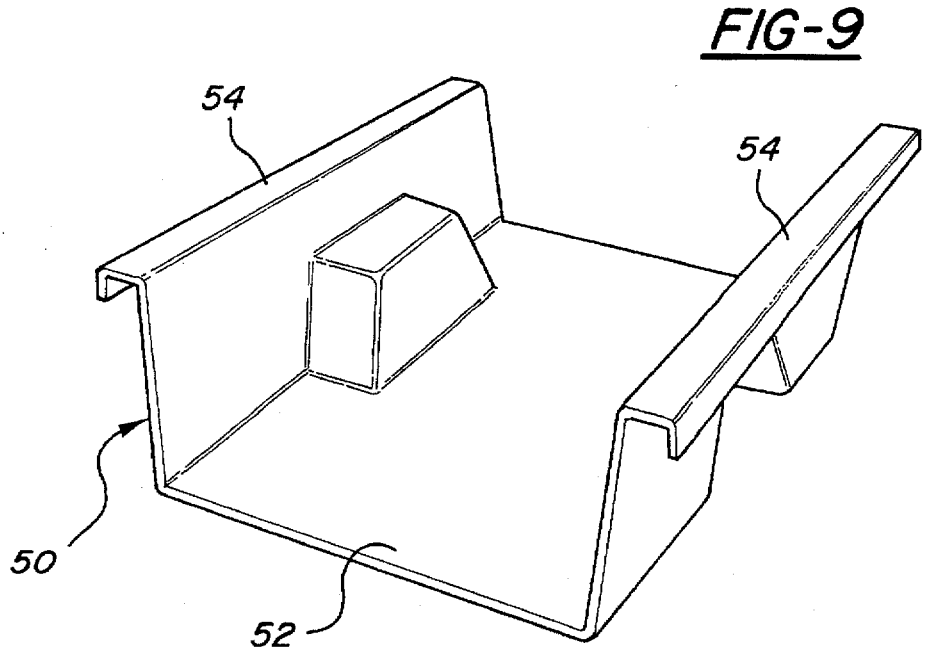

APPARATUS AND METHOD FOR FABRICATING A PREFORM HAVING A NARROW CHANNEL FLANGE

TECHNICAL FIELD

This invention relates generally to directed fiber preforming and, more particularly, to an improved apparatus and process for forming a fiber preform.

BACKGROUND OF THE INVENTION

Reinforcing fibers are commonly incorporated in thermoplastic molded articles and other cured plastics to add strength and durability. The reinforcing fibers are introduced into a mold, then resinous plastic is injected to imbed the reinforcing fibers in the final formed article. It has been found to be advantageous to first fabricate a preform of the final article out of reinforcing fibers and place the preform into the mold. To fabricate the preform, the reinforcing fibers are often chopped and blown onto a preform screen. A binder agent is sprayed either directly into the stream of fibers being blown onto the screen or directly onto the fibers immediately after they have been blown onto the screen. The binder agent is then allowed to cure, which sets the fibers in place. A vacuum draw is sometimes used to hold the fibers in place against the screen while the binder is curing. Prior to curing, a layer of fabric is often spread across the freshly-deposited layer of chopped fiber glass and binder to bond onto the preform as the binder cures, providing the finished preform with an integral fabric skin.

When this reinforcing fiber process is used to fabricate preforms with narrow channel flanges, the airflow around the screen caused by the vacuum draw causes the chopped reinforcing fibers to accumulate in the corners formed between each flange's floor and walls. This uneven deposition distorts each flange's interior dimensions preventing the final article from fitting properly when mated with adjacent structures.

Another problem with using this process to form narrow channel flange preforms is that it is difficult to apply a fabric layer in the close confines of a narrow channel flange. Specifically, it is difficult to tuck the fabric into both the corners formed between the floor and sidewalls of a narrow channel flange.

What is needed is a process for manufacturing a narrow channel flange preform that more evenly deposits chopped reinforcing fibers and binder on the inner surfaces of the narrow channel flange and that makes it easier to apply a fabric layer to the preform prior to curing. One object of the invention is to be able to form narrow channel flanges along the top of each side wall of a bed-liner for a pickup truck.

SUMMARY OF THE INVENTION

In accordance with one aspect of this invention a process is provided for manufacturing a fibrous preform with a narrow channel flange. The process includes the steps of providing a foraminous preform vacuum screen with a narrow channel flange that matches the shape of the preform's flange. The channel has a hinge that connects a channel floor with an outer channel wall. Before spraying reinforcing fibers and binder onto the screen, the outer wall is rotated outward about the hinge until it lays parallel to the channel floor. The outer wall is then rotated upward and inward and the binder is allowed to cure—binding the fibers together into a fibrous preform. After curing the side wall is rotated open and the preform is removed from the screen.

Because this improved process includes laying the hinged outer wall flat prior to deposition, the channel wall and floor receive a more uniform deposition of fibers.

A plug may be advanced into the narrow channel after spraying fibers and binder onto the screen. The plug is shaped to maintain uniform fiber preform coating thickness within the channel during curing. In other words, the plug prevents the fiber coating from sagging down the sidewalls and accumulating in the corners. After curing, the plug is removed.

A fabric layer may be applied to the preform after spraying fibers and binder onto the screen and before advancing the plug into the channel. The plug is shaped so that, when inserted, it tucks the fabric into the lower corners formed between the channel floor and side walls.

In accordance with another aspect of the invention, an apparatus is provided for use in manufacturing a fibrous preform with a narrow channel flange. A preform screen includes a narrow channel flange that integrally extends from a main body portion. A fiber source is positioned to emit a stream of chopped fibers toward the deposition surface. A binder source is positioned to emit binder toward either the fiber stream or the deposition surface. The narrow channel flange has a hinge that connects a channel floor to an outer channel wall. The hinge allows the outer wall to be rotated outward to a position parallel with the floor so that the fiber and binder sources can deposit fiber and binder in an even layer over both the floor and the outer wall. Prior to curing, the outer wall can then be rotated back to a position generally perpendicular to the channel floor.

The chopped fibers may be retained on the preform screen by using a suction fan creating a vacuum draw through the preform screen and providing a retaining suction force on the chopped fibers onto the preform screen.

BRIEF DESCRIPTION OF THE DRAWINGS

To better understand and appreciate the invention, refer to the following detailed description in connection with the accompanying drawings:

FIG. 3 is an end view of a narrow channel flange shown in FIG. 1 with chopped reinforcing fiber in place;

FIG. 4 is another end view of a narrow channel flange shown in FIG. 1 following fiber placement and flange closure;

FIG. 5 is an end view of a narrow channel flange in accordance with a second embodiment of the invention wherein a plug is used to shape the fiber placement prior to flange closure;

FIG. 6 is another end view of the narrow channel flange of FIG. 5 following flange closure;

FIG. 7 is another end view of the narrow channel flange of FIG. 5 following plug removal;

FIG. 8 is an end view of a narrow channel flange in accordance with a third embodiment of the invention; and FIG. 9 is a perspective view of a pickup truck bed liner manufactured in accordance with the present invention.

DETAILED DESCRIPTION OF THE PREFERRED EMBODIMENT

Figure 1:
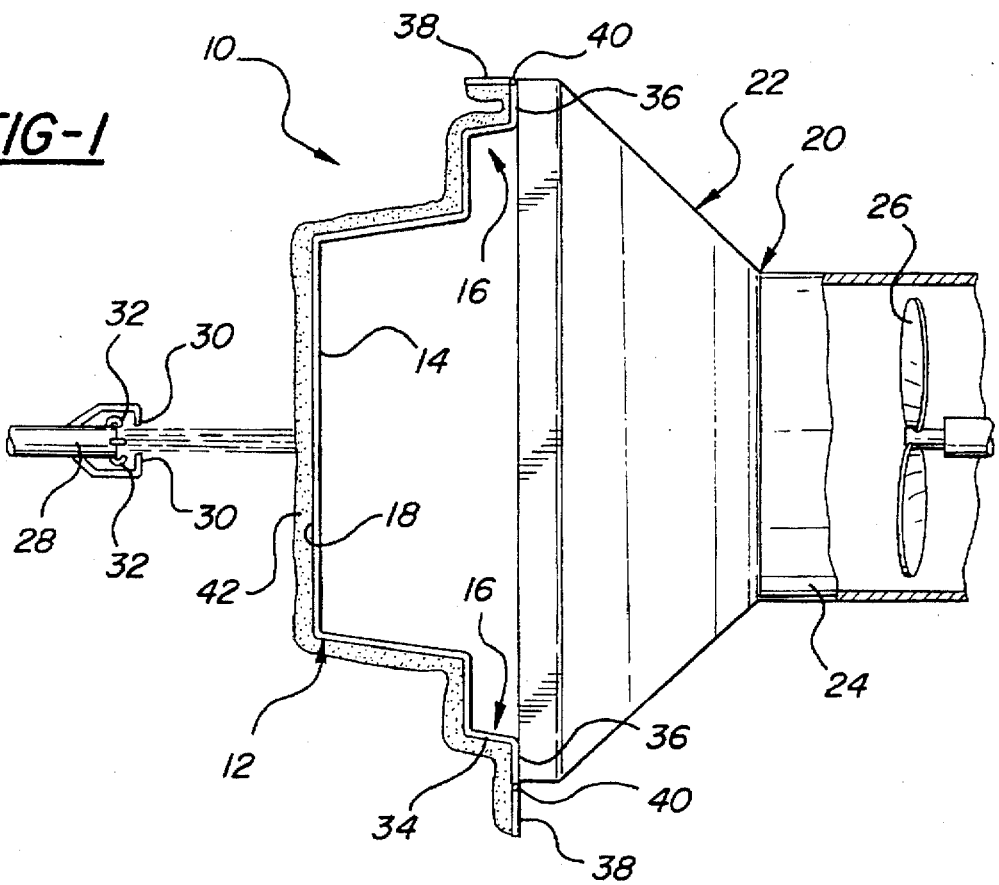
FIG. 1 is a schematic view of the inventive structure.

FIG. 1 discloses an apparatus 10 for use in manufacturing a fibrous preform. The apparatus 10 includes a foraminous screen 12 shaped to match the desired shape of the fibrous preform to be manufactured—in this case, a fibrous, e.g., fiberglass, preform with a narrow channel flange. While glass fibers are used in a preferred embodiment, the present invention is applicable for use with other reinforcing fibers such as carbon filament fibers, high-strength plastic fibers such as Kevlar® (trademark of DuPont corporation) and polyethylene terephthalate (PET) fibers.

To create the fibrous preform, a mixture of fibers and liquid or dry particle binder are sprayed on the screen 12, left to cure then removed from the screen 12 as a completed article. The process is repeated to form additional fibrous preforms of the same shape.

Figure 2:
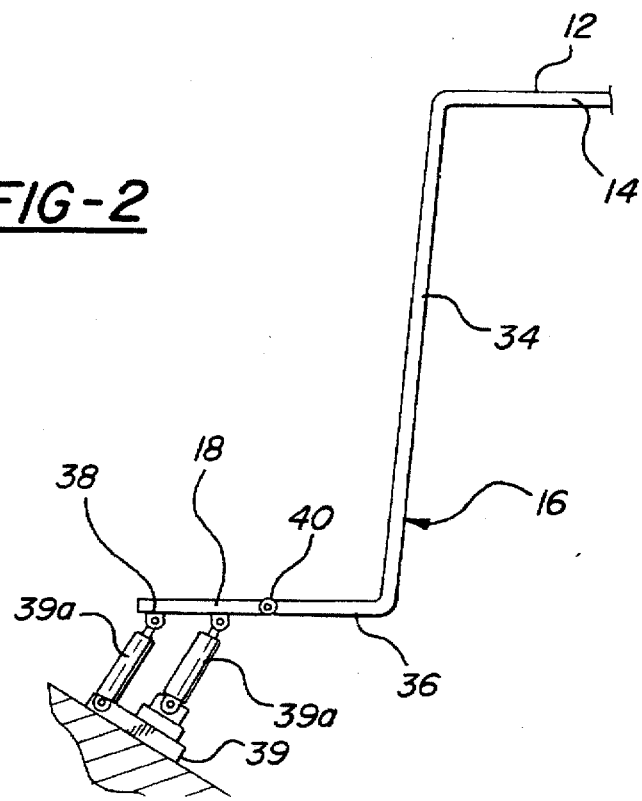
FIG. 2 is a fragmentary, enlarged end view of a narrow channel flange without a fiber coating.

To form the main body of a flanged fibrous preform, the screen 12 includes an identically-shaped main body 14. To form the narrow channel flange portion of the fibrous preform, the screen 12 includes, at its periphery, an identically-shaped narrow channel flange, generally indicated at 16 in FIGS. 1–4. The flange 16 is shown in "channel-shape" in FIGS. 1 and 4. In FIGS. 2 and 3, one wall of the channel is hinged open for reasons to be discussed.

The screen's flange 16 is shaped from the same piece of screen 12 as the main body 14 so that it integrally extends from the main body 14 of the screen 12. The main body 14 and flange 16 define a common deposition surface 18, i.e., a surface intended to receive and support a deposited layer of chopped fiber and binder in accordance with the method of the present invention to be described.

The screen 12 is connected, at its periphery, to a vacuum fixture, generally indicated at 20 in FIG. 1. As shown in FIG. 1 the vacuum fixture 20 includes a mounting housing 22 having the shape of a hopper with a large opening on one end and a smaller opening on the other end. The screen 12 is mounted across the large opening of the mounting housing 22. The small mounting housing opening is connected to a duct 24 leading to a vacuum source. The vacuum fixture 20 draws a gaseous medium, i.e. air, through the mounting housing 22 and the screen 12. The vacuum source is a ducted fan 26 mounted within the duct 24.

As shown in FIG. 1 a fiber source in the form of a fiber spray nozzle 28 is spaced a short distance away from the deposition surface 18. The fiber nozzle 28 is positioned on the side of the screen 12 opposite the housing 22 and vacuum fixture 20. The fiber nozzle 28 blows chopped fibers onto the screen's deposition surface 18.

The fiber source is adapted to vary the impact angle of the fiber stream to accommodate an irregular deposition surface 18 through a method known as "directed fiber preforming". According to this method, a plurality of air nozzles 30 may be positioned around and directed towards the fiber stream. An operator can control the fiber stream's direction by selectively directing air from the air nozzles 30 toward the fiber stream. A more detailed disclosure of one example of such a method is included in U.S. Pat. No. 5,167,653 granted Sep. 15, 1992 to Nelson and incorporated herein by reference.

One or more binder spray nozzles 32 are spaced a short distance from the deposition surface 18 and the fiber stream. The binder nozzles 32 spray a liquid or dry particle binder directly into the fiber stream to cause the binder to mix with the fibers prior to impacting the deposition surface 18.

Other examples of acceptable methods and structures of directed fiber preforming for depositing fiber and binder on the screen 12 are disclosed in detail in U.S. Pat. Nos. 5,167,653 granted Sep. 15, 1992 to Nelson; 5,217,672 granted Jun. 8, 1993 to Kelman et al.; 5,328,494 granted Jul. 12, 1994 to Kelman et al. and 5,413,750 granted May 9, 1995 to Kelman et al., all of which are incorporated herein by reference.

The narrow channel flange 16 includes an inner wall 34 that extends integrally from and generally perpendicular to the screen's main body 14. The flange 16 also has a narrow channel floor 36 that extends laterally outward from and perpendicular to the inner wall 34. A channel outer wall 38 projects upward from the channel floor 36 toward the fiber nozzle 28 when positioned as shown in FIG. 4 and at the top of FIG. 1. In this position, the outer wall 38 is perpendicular to the floor 36 and parallel to the inner wall 34.

A hinge 40 connects the channel floor 36 to the channel outer wall 38. This allows the outer wall 38 to lay flat and generally parallel to the channel floor 36 in a generally co-planar relationship with the channel floor 36 as shown at the bottom of FIG. 1 and in FIGS. 2 and 3. The outer wall 38 is laid flat in this manner during deposition of fibers and binder so that the deposition surface 18 is generally perpendicular to the incoming stream of fiber and binder across the full height and width of the screen 12. Therefore, the fiber 28 and binder 32 spray nozzles are able to deposit fiber and binder in an even layer across both the channel floor 36 and the channel outer wall 38. In the apparatus, rod actuators 39 including suitable drive cylinders 39a are operable to provide the desired rotating outer wall 38.

In practice, according to the method of the present invention, a fibrous preform is manufactured by providing a foraminous preform screen 12 to match the desired shape of the fibrous preform article to be manufactured. The so provided preform screen 12 has a narrow channel flange 16 with a channel outer wall 38 attached to the floor 36 by a hinge 40. The completed screen 12 is then sealingly mounted to the housing 22.

The method further includes the step of positioning the channel outer wall 38 by rotating it outwardly until it lays flat and generally co-linear with the channel floor 36. In practice, the flanged channels 16 will both be positioned as shown at the bottom of FIG. 1.

A vacuum is then drawn through the screen 12. A blower/cutter assembly, as described in U.S. Pat. Nos. 5,147,653; 5,217,672; 5,328,494 and 5,413,750, is turned on and sends cut fibers through the fiber spray nozzle 28 and onto the screen 12. At the same time, the binder nozzle 32 sprays binder into the stream of fibers blowing from the fiber nozzle 28. Air nozzles 30 can be provided to blow air on the fiber/binder stream to direct the fibers and binder toward the screen 12 at varying angles. Alternatively, the nozzles 28 and 30 can be controlled to traverse laterally and/or vertically of the screen 12 (including the flattened walls 38). The fibers and binder are deposited on the screen 12 as a fiber preform coating 42. After depositing the fiber preform coating 42 the outer wall 38 is rotated upward and inward about the hinge 40 until it is arranged generally perpendicular to the channel floor 36. The binder is then allowed to cure so as to bind the fibers together into a self-supporting fibrous preform. Once the binder has cured, the outer wall 38 is rotated away from the main body 14 of the screen 12 and the newly-cured fibrous preform is removed from the screen 12.

According to a second embodiment of this invention, the apparatus and method can include a shaping plug 44. In this embodiment, the plug 44 is advanced into the channel 16 after the fibers and binder have been deposited onto the screen 12, as shown in FIG. 5. The plug 44 is shaped so that when it is inserted into the channel 16 and the channel outer wall 38 is rotated to its upright position, as shown in FIG. 6, the plug 44 causes the uncured fiber preform coating 42 to form evenly on all the interior surfaces of the channel 16. Once the fiber coating 42 cures, the plug 44 is removed, as shown in FIG. 7, the channel outer wall 38 is rotated outward and the cured fiber preform is removed from the screen 12. To facilitate removal, a release coating may be applied to the outer surface of the plug prior to insertion.

Reference numerals with the suffix "b" in FIGS. 5-7 designate elements common to the first embodiment shown in FIGS. 1-4. Where such FIGS. 1-4 description refers to an element with a reference numeral having no suffix, we intend such description to apply equally to elements in FIGS. 5-7 indicated by the same reference numeral with the suffix "b".

According to a third embodiment of this invention, a fabric layer, shown at 46 in FIG. 8, is spread over the uncured fiber coating 42 before the plug 44 is advanced into the channel 16 and the outer wall 38 is rotated upward. This additional step provides the fiber preform with an integral fabric skin 42. Examples of a suitable fabric layer include glass fiber matting, woven carbon filaments, woven Kevlar® and PET fibers.

Reference numerals with the suffix "c" in FIG. 8 designate elements common to the first embodiment shown in FIGS. 1-4 and the second embodiment shown in FIGS. 5-7. Where this description refers to an element with a reference numeral having no suffix or the suffix "b", we intend the description to apply equally to elements in FIG. 8 indicated by such same reference numerals with the suffix "c".

As is shown in FIG. 9, an example of a product formed by the present invention is a bed liner 50 for a pickup truck cargo box. The bed liner 50 is formed by a resin-impregnated preform defining a bed 52 and top flanged side walls 54, 56.

By using a preform screen with a hinged outer flange channel wall, and by laying the outer wall flat prior to spraying fiber and preform on the screen, it is possible to achieve more uniform thickness in fiber preforms with narrow channel flanges.

This is an illustrative description of the invention using words of description rather than of limitation. Obviously, many modifications and variations of this invention are possible in light of the above teachings. Within the scope of the claims one may practice the invention other than as described.

We claim:

1. A process for forming a fibrous preform using an apparatus comprising a preform screen having a narrow channel flange with a hinged channel outer wall; said process comprising the steps of:
   providing a foraminous preform screen comprising a narrow channel flange having a channel floor and a channel outer wall and a hinge connecting the floor to the outer wall;
   drawing a vacuum through the screen;
   rotating the channel outer wall outward about the hinge until it lays flat and generally parallel to the channel floor;
   blowing fibers onto the screen;
   spraying binder onto the fibers forming a fiber preform coating on the screen;
   rotating the outer wall upward and inward about the hinge;
   allowing the binder to cure and bind the fibers together into a fibrous preform;
   rotating the side wall open; and
   removing the fibrous preform from the screen.

2. A process as defined in claim 1 further including the step of advancing a plug into the narrow channel after said steps of spraying fibers and binder onto the screen, said plug shaped to maintain uniform fiber preform coating thickness within the channel during curing.

3. A process as defined in claim 1 further including the step of removing the plug following said step of allowing the binder to cure.

4. A process as defined in claim 2 further including the step of applying a fabric layer to the preform following said step of spraying fibers and binder onto the screen and before said step of advancing the plug into the channel.

5. A process as defined in claim 1 further including the step of blowing air on the fibers to direct them toward the screen.

6. An apparatus for use in manufacturing a fibrous preform with a narrow channel flange, said apparatus comprising:
   a screen including a main body and a narrow channel flange integrally extending from said main body, said main body and flange defining a common deposition surface;
   a fiber source spaced from said deposition surface, said fiber source adapted to emit a stream of chopped fibers toward said deposition surface;
   a binder source spaced from said deposition surface and said fiber stream, said binder source adapted to emit binder toward one of said fiber stream and said deposition surface;
   said flange including a narrow channel floor extending laterally outward from said main body and a channel outer wall extending from said channel floor toward said fiber source; and
   a hinge connecting said channel floor to said channel outer wall to allow said outer wall to lay flat and generally parallel to said channel floor so that said fiber source and said binder source can deposit fiber and binder in an even layer over both said floor and said outer wall.

7. An apparatus as defined in claim 6 further comprising:
   a plurality of holes disposed through said screen; and
   a vacuum fixture mounted to said screen, said fixture adapted to draw a gaseous medium through said holes from a side where said fiber and binder sources are positioned to an opposite side.

8. An apparatus as defined in claim 7 wherein said screen includes a periphery and where said vacuum fixture includes a mounting housing, said screen being mounted about its periphery to said housing.

9. An apparatus as defined in claim 8 wherein said vacuum fixture includes a vacuum source disposed adjacent and in gaseous communication with said housing.

10. An apparatus as defined in claim 9 wherein said vacuum source comprises a ducted fan.

* * * * *